(12) United States Patent
Cooper et al.

(10) Patent No.: US 9,858,611 B2
(45) Date of Patent: Jan. 2, 2018

(54) SELF-MEASURING GARMENT

(71) Applicant: Like A Glove Ltd., Tel Aviv (IL)

(72) Inventors: Simon Cooper, Ashdod (IL); Michael Slobodkin, Tel Aviv (IL)

(73) Assignee: LIKE A GLOVE LTD., Tel Aviv (IL)

(*) Notice: Subject to any disclaimer, the term of this patent is extended or adjusted under 35 U.S.C. 154(b) by 587 days.

(21) Appl. No.: 14/538,909

(22) Filed: Nov. 12, 2014

(65) Prior Publication Data

US 2015/0342266 A1 Dec. 3, 2015

Related U.S. Application Data

(60) Provisional application No. 62/004,320, filed on May 29, 2014, provisional application No. 62/030,631, filed on Jul. 30, 2014.

(51) Int. Cl.
A61B 5/103 (2006.01)
G06Q 30/06 (2012.01)
A41B 11/00 (2006.01)
A41C 3/00 (2006.01)
A41H 1/02 (2006.01)
A41H 1/10 (2006.01)
A41H 3/00 (2006.01)

(52) U.S. Cl.
CPC .......... *G06Q 30/0631* (2013.01); *A41B 11/00* (2013.01); *A41C 3/00* (2013.01); *A41H 1/02* (2013.01); *A41H 1/10* (2013.01); *A41H 3/007* (2013.01); *G06Q 30/0635* (2013.01)

(58) Field of Classification Search
CPC ........ G06Q 30/0631; A41H 1/02; A41H 1/10; A41H 3/007

USPC .................................................. 33/2 R, 17 R
See application file for complete search history.

(56) References Cited

U.S. PATENT DOCUMENTS

| 4,598,376 | A | | 7/1986 | Burton |
| 4,635,367 | A | | 1/1987 | Vigede |
| 4,651,427 | A | | 3/1987 | Perry |
| 4,885,844 | A | | 12/1989 | Chun |
| 4,974,331 | A | * | 12/1990 | Watterson ................ A41H 1/02 33/15 |
| 5,406,715 | A | | 4/1995 | Koizumi et al. |

(Continued)

FOREIGN PATENT DOCUMENTS

| CN | 102697225 A | 10/2012 |
| WO | 2006034291 A2 | 3/2006 |
| WO | 2013188908 A1 | 12/2013 |

OTHER PUBLICATIONS

International Application # PCT/IB2015/053336 Search Report dated Sep. 3, 2015.

(Continued)

*Primary Examiner* — G. Bradley Bennett
(74) *Attorney, Agent, or Firm* — D.Kligler IP Services Ltd.

(57) ABSTRACT

Measurement apparatus includes an elastic fabric, configured as a garment to be worn over a part of a body of a human subject. One or more conductive fibers are integrated with the elastic fabric to as to stretch together with the elastic fabric when worn over the part of the body. A controller is coupled to measure a change in an electrical property of the one or more conductive fibers in response to stretching of the elastic fabric, and to output an indication of a dimension of the part of the body based on the measured change.

27 Claims, 9 Drawing Sheets

(56) References Cited

U.S. PATENT DOCUMENTS

| | | | |
|---|---|---|---|
| 5,610,528 A | 3/1997 | Neely et al. | |
| 5,691,923 A | 11/1997 | Adler et al. | |
| 5,956,525 A | 9/1999 | Minsky | |
| 6,415,199 B1 | 7/2002 | Liebermann | |
| 6,490,534 B1 | 12/2002 | Pfister | |
| 6,516,240 B2 | 2/2003 | Ramsey et al. | |
| 6,563,107 B2 | 5/2003 | Danisch et al. | |
| 7,162,441 B2 | 1/2007 | Nabarro | |
| 7,301,435 B2 | 11/2007 | Lussey et al. | |
| 7,346,421 B2 | 3/2008 | Bijvoet | |
| 7,594,442 B2 | 9/2009 | Kaiserman et al. | |
| 7,685,727 B2 | 3/2010 | Sieber | |
| 7,752,769 B1 | 7/2010 | Cheh | |
| 7,826,997 B2 | 11/2010 | Wang | |
| 7,905,028 B2 | 3/2011 | Sieber | |
| 8,083,693 B1 | 12/2011 | McKeon et al. | |
| 8,095,426 B2 | 1/2012 | Adelman et al. | |
| 8,655,053 B1 | 2/2014 | Hansen | |
| 2002/0166254 A1 | 11/2002 | Liebermann | |
| 2003/0139896 A1 | 7/2003 | Dietz et al. | |
| 2004/0006878 A1* | 1/2004 | Grove | A41H 1/02 33/17 R |
| 2004/0227752 A1 | 11/2004 | McCartha et al. | |
| 2009/0287452 A1 | 11/2009 | Stanley et al. | |
| 2010/0070384 A1 | 3/2010 | Kruusmaa et al. | |
| 2010/0111370 A1 | 5/2010 | Black et al. | |
| 2012/0030062 A1 | 2/2012 | Stauffer et al. | |
| 2012/0284148 A1 | 11/2012 | Volchek | |
| 2013/0108121 A1 | 5/2013 | De Jong | |
| 2013/0197399 A1 | 8/2013 | Montgomery | |
| 2013/0211208 A1 | 8/2013 | Varadan et al. | |
| 2013/0219434 A1 | 8/2013 | Farrell et al. | |
| 2013/0262260 A1 | 10/2013 | Giloh et al. | |
| 2014/0031700 A1 | 1/2014 | Ferrantelli | |
| 2014/0298667 A1* | 10/2014 | Alkhalaf | A61B 5/1077 33/514.2 |
| 2015/0081468 A1* | 3/2015 | Fenimore | G06Q 30/0621 705/26.5 |
| 2017/0150764 A1* | 6/2017 | Meloni | A41H 1/10 |

OTHER PUBLICATIONS

LESS EMF Inc, Silverell Fabric Data Sheet, 1 page, Oct. 18, 2013.
European Application #15799590.3 search report dated Oct. 24, 2017.
CN Application #2015800285780 office action dated Aug. 15, 2017.

* cited by examiner

SELF-MEASURING GARMENT

CROSS-REFERENCE TO RELATED APPLICATIONS

This application claims the benefit of U.S. Provisional Patent Application 62/004,320, filed May 29, 2014, and of U.S. Provisional Patent Application 62/030,631, filed Jul. 30, 2014, both of which are incorporated herein by reference.

FIELD OF THE INVENTION

The present invention relates generally to fitting of clothing, and specifically to methods and apparatus for automatic measurement and fitting of clothing sizes.

BACKGROUND

When buying clothes or shoes in a store or, particularly, on line, it is often hard to know the right size or how well a given item will fit without trying it on first. Very often, the nominal size itself is not a sufficient indicator, since different garments of the same indicated size might have different contours and dimensions, which do not always match well the contours and dimensions of the body of the person for whom the garments are intended.

A number of solutions to this problem have been proposed in the patent literature. For example, U.S. Pat. No. 7,162,441 explains the difficulties inherent in bra fitting, due to variations in size, shape and disposition of the breasts, by the amorphous nature of the breasts themselves, and by the fact that many women are never measured for bra size, either professionally or otherwise. Furthermore, changes occur to the size and shape of breasts at different times during the menstrual cycle and as the years progress, as well as during and after pregnancy. When choosing bras from mail order catalogues or via the Internet, the option of trying a bra for fit is much more restricted since, if the bra does not fit, it must be returned to the provider, usually by mail, and another choice made. If the consumer is unsure of the size she requires, it could take several attempts and much time and frustration before an appropriate bra is found. The quest to find a correctly-fitting bra is further complicated by the problems that many women fall in between available standard sizes, and that the so-called standard sizes are not uniform among different makes and styles of bras.

In response to this problem, U.S. Pat. No. 7,162,441 describes a method that involves establishing a database of bras containing bra characteristic data including bra size and bra cup size measured from a sample of actual bras. A wearer's breast and torso size are measured to obtain wearer characteristic data. The database is searched to find bra characteristic data within the database matching the wearer characteristic data, and any bras in the database whose characteristics match the wearer characteristic data are listed for selection by the wearer. The patent describes a bra measuring apparatus, which comprises support means for supporting a bra, at least one bladder expandable under internal fluid pressure within a cup of a bra thus supported, and measurement means for measuring the volume and/or pressure of the fluid within the bladder when the cup of the bra has been filled.

As another example, U.S. Pat. No. 4,635,367 describes a system for taking body measurement and producing garments in which body measurements are taken by attaching a number of measuring tapes to a person. Each measuring tape is provided with at least one electrically-detectable measuring range within which at least one individual measuring point is detected by means of an electrical connector positioned at the measuring points, for converting the detected measuring point to an electric signal. The signal from each measuring point is supplied to a central memory and calculating unit in which the body measurements of the person are converted into a pattern for the manufacture of the garment.

As still another example, U.S. Pat. No. 7,905,028 describes systems and methods for collecting body measurements, virtually simulating models of actual and target body shapes, ascertaining garment size fitting, and processing garment orders. Body measurements are collected using a measuring device having a belt with a first scale of measurement indicia and a strip with a second scale of measurement indicia.

SUMMARY

Embodiments of the present invention provide improved apparatus and methods for measuring body dimensions, as well as methods and systems that enable a user to select appropriately-sized clothing based on such measurements.

There is therefore provided, in accordance with an embodiment of the present invention, measurement apparatus, including an elastic fabric, configured as a garment to be worn over a part of a body of a human subject. One or more conductive fibers are integrated with the elastic fabric to as to stretch together with the elastic fabric when worn over the part of the body. A controller is coupled to measure a change in an electrical property of the one or more conductive fibers in response to stretching of the elastic fabric, and to output an indication of a dimension of the part of the body based on the measured change.

In some embodiments, the controller is configured to measure the change in an inductance of the one or more conductive fibers in response to the stretching of the elastic fabric. The one or more conductive fibers may be attached to the elastic fabric in a zigzag pattern, such that an angle between segments of the zigzag pattern changes in response to the stretching of the elastic fabric, thereby changing the inductance.

Alternatively or additionally, the controller may be configured to measure the change in a resistance of the one or more conductive fibers in response to the stretching of the elastic fabric.

Typically, the garment includes multiple conductive fibers arranged along multiple different paths within the garment, and the controller is configured to output indications of multiple dimensions of the part of the body corresponding to the different paths. The multiple different paths may be chosen so that the multiple dimensions are indicative of a shape of the part of the body over which an article of clothing is to be fitted.

In a disclosed embodiment, the garment includes a non-elastic area, and wherein the apparatus includes at least one reference fiber integrated with the non-elastic area of the garment and coupled to the controller so as to provide a reference against which the change in the electrical property of the one or more conductive fibers is measured.

In some embodiments, the garment includes a brassiere, a sock or leggings. In other embodiments, the garment is configured to be worn over a torso of the human subject.

In the disclosed embodiments, the controller includes a wireless communication link and is configured to output the indication of the dimension to a computing device via the wireless communication link. The computing device is typically configured to identify, responsively to the dimension of the part of the body, one or more articles of clothing of a suitable size to be worn by the human subject and to present the one or more articles of clothing on a display so as to enable the subject to select at least one of the articles.

There is also provided, in accordance with an embodiment of the present invention, a method for fitting, which includes providing a garment including an elastic fabric configured to be worn over a part of a body of a human subject and to output electronically an indication of a dimension of the part of the body in response to stretching of the elastic fabric when worn over the part of the body. The indication of the dimension is received from the garment. Responsively to the dimension of the part of the body, one or more articles of clothing are identified of a suitable size to be worn by the human subject.

In some embodiments, receiving the indication includes receiving a message containing the indication, which is transmitted over a network from a computing device, which receives the indication from the garment. Account details with respect to the subject may be stored and linked to the dimension of the part of the body for use in a sales transaction in which one of the identified articles of clothing is supplied to the subject.

In a disclosed embodiment, identifying the one or more articles includes presenting the one or more articles to the subject on a display along with an order button for selection by the subject. The method may include completing the sales transaction, using the stored account details, in response to the selection by the subject of the order button presented with one of the articles, without additional input by the subject in connection with the selection.

Additionally or alternatively, identifying the one or more articles includes applying the dimension of the part of the body in searching over one or more on-line stores in order to identify the one or more articles of clothing.

In an alternative embodiment, receiving the indication includes receiving a transmission from the garment worn by the human subject in a commercial premises, and wherein identifying the one or more articles includes presenting to the user an article offered for sale on the commercial premises.

The present invention will be more fully understood from the following detailed description of the embodiments thereof, taken together with the drawings in which:

DETAILED DESCRIPTION OF EMBODIMENTS

Figure 1:
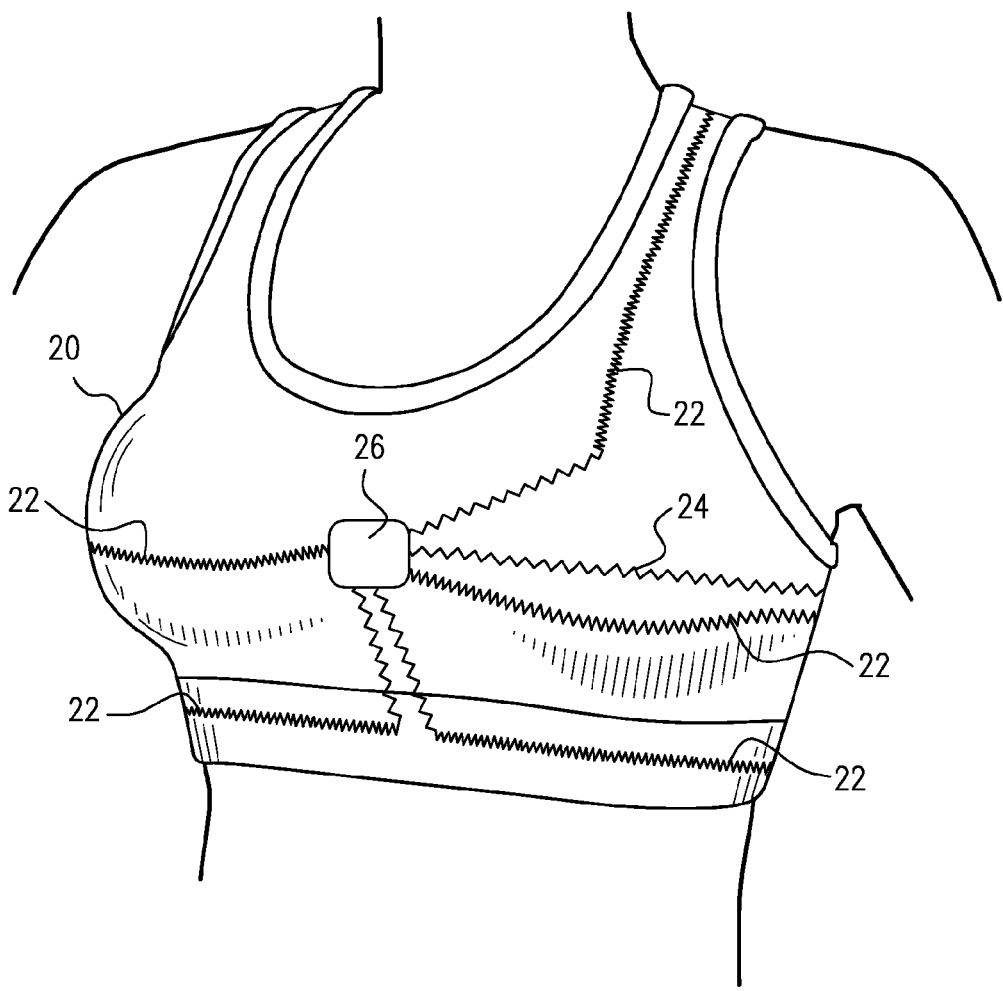
FIG. 1 is schematic, pictorial illustration of a self-measuring garment, in accordance with an embodiment of the present invention.

Embodiments of the present invention that are disclosed herein provide apparatus and methods for measuring a person's body shape and size, as well as matching clothing to the measurements, without requiring that the person actually try on the clothing. The embodiments described below provide a garment, made of stretchable fabrics and electronics, that hugs a part of the person's body, automatically measures the person's body shape and/or size electronically, and thus enables better matching of clothing sizes to body dimensions. The disclosed embodiments are particularly beneficial in selecting hard-to-fit items, such as brassieres and shoes, but can be used in fitting substantially any sort of clothing, worn over any part of the body.

In some embodiments, this self-measuring garment is used in conjunction with methods for on-line shopping, enabling users to select better-fitting clothes with the help of the body shape measurement and fitting techniques described herein. In alternative embodiments, the self-measuring garment can be used in conjunction with methods for applying the body shape and size measurements in "brick and mortar" stores to suggest items for purchase. The body measurements provided by the self-measuring garment can be stored in conjunction with a personal measurements account for later use by the customer in the same or other stores or on line.

As described in detail hereinbelow, some embodiments of the present invention provide measurement apparatus, referred to herein as a "self-measuring garment," comprising an elastic fabric, which is cut and sewn to form a garment to be worn over a part of a body of a human subject. One or more conductive fibers are integrated with the elastic fabric and stretch together with the fabric when worn over the intended part of the body. An electronic controller, which is typically attached to the garment, measures changes in an electrical property of the conductive fibers, such as inductance or resistance, in response to stretching of the fabric, and thus outputs an indication of one or more dimensions of the part of the body in question.

Typically, the self-measuring garment comprise multiple conductive fibers arranged along multiple different paths within the garment, thus enabling the controller to output indications of multiple dimensions of the part of the body in question, corresponding to the different paths. The multiple different paths are chosen so that the dimensions they provide are indicative of the shape of the part of the body. Thus, for example, the garment may have the form of a brassiere and may output not only chest circumference and cup size, but also other measurements giving a complete shape profile of the subject's upper body and breasts. As other examples, the garment may have the form of a sock, to enable shoe selection, or leggings, or may be designed to be worn over the torso of the subject, such as a shirt, jacket or pants. In this latter category, a single full-body measuring suit could be used for fitting multiple different types of clothing.

Because the measurements are made by an actual garment, they can include changes in shape and dimensions that occur due to breathing and other body movements and conditions. The user could be prompted to take measurements in several body positions, as well as to take different measurements that represent minimum and maximum size requirements. For example, when fitting jeans using self-measuring pants or leggings, the user may be prompted to take one measurement standing up and another sitting down, after which both results are analyzed by a computer running suitable software in order to find the fit that will be best for both walking and sitting.

In some embodiments, the controller comprises a wireless communication link, over which the indications of body dimensions are output to a computing device, such as a computer (including tablet computers) or a smartphone. The computing device may then identify, based on the measured dimensions, one or more articles of clothing of a suitable size to be worn by the subject, and may present these articles on a display so as to enable the subject to select at least one of the articles. The identification of the suitable clothing by the computing device may be based on data stored locally by the computing device or data provided by a remote server, or both.

In on-line applications, the computing device typically transmits the body dimensions over a network to a server, which then returns appropriate product information to the user's computing device for display and selection by the user. This arrangement enables the user to buy even hard-to-fit clothing, such as brassieres and shoes, on line, with confidence that the clothing will fit properly. At the same time, the self-measuring garment is self-contained and easy to use, requiring no cameras or other external equipment beyond the conventional computing device that receives the output from the garment. Such embodiments thus have the dual benefits of maintaining user privacy while enabling fast, accurate fitting and product selection.

Design and Operation of Self-Measuring Garments

FIG. 1 is schematic, pictorial illustration of a self-measuring garment 20, in accordance with an embodiment of the present invention. Garment 20 comprises a base made of elastic fabric, which is cut, shaped and sewn in the form of a brassiere. Thin conductive fibers 22, 24, such as enameled coil wires of the type commonly used in transformers, are integrated with the fabric along different paths, such as around the breasts and lower chest and over the shoulders, as shown in the figure. These particular stitch paths are shown, however, solely by way of illustration, and fibers may similarly be sewn along other paths in accordance with application requirements.

In the present example, fibers 22 and 24 are sewn into the fabric in zigzag stitch patterns. These patterns may be formed, for example, by loading the lower bobbin of a sewing machine with the conductive fiber and the upper bobbin with ordinary, non-conductive thread, and then operating the machine to produce the stitches along the desired paths, as though the conductive fiber were ordinary thread. Parameters such as the stitch pattern, density, and width may be varied using techniques that are known in the art. In this manner, for example, fibers 22 are stitched in a denser zigzag than fiber 24. Alternatively or additionally, other patterns than zigzag may be used, with greater or lesser inductance (and even near-zero inductance where desired).

The zigzag pattern of fibers 22 and 24 creates inductance, which is a function of the stitch density (or equivalently, the zigzag angle and width). When the fabric of garment 20 stretches along a particular dimension, the stitch angle of the corresponding fibers will increase, and the inductance will decrease accordingly. A controller 26 (described in detail hereinbelow with reference to FIG. 2) senses the changes in inductance and accordingly estimates the measurements of the garment along the paths of the fibers. The different stitch densities of fibers 22 and 24 may be chosen according to the desired measurement resolution along the corresponding paths. Additionally or alternatively, a given fiber may be stitched densely in the areas whose dimensions are to be measured (such as the part of fiber 22 extending over the subject's shoulder in FIG. 1) and more loosely in segments intended only to couple the measurement segments to controller 26. Alternatively, a different stitch pattern (rather than zigzag) with inherently low inductance may be used in these latter segments. Consequently, stretching of garment 20 in the area to be measured will have a more marked effect (in terms of percentage change) on the inductance sensed by the controller.

Figure 2:
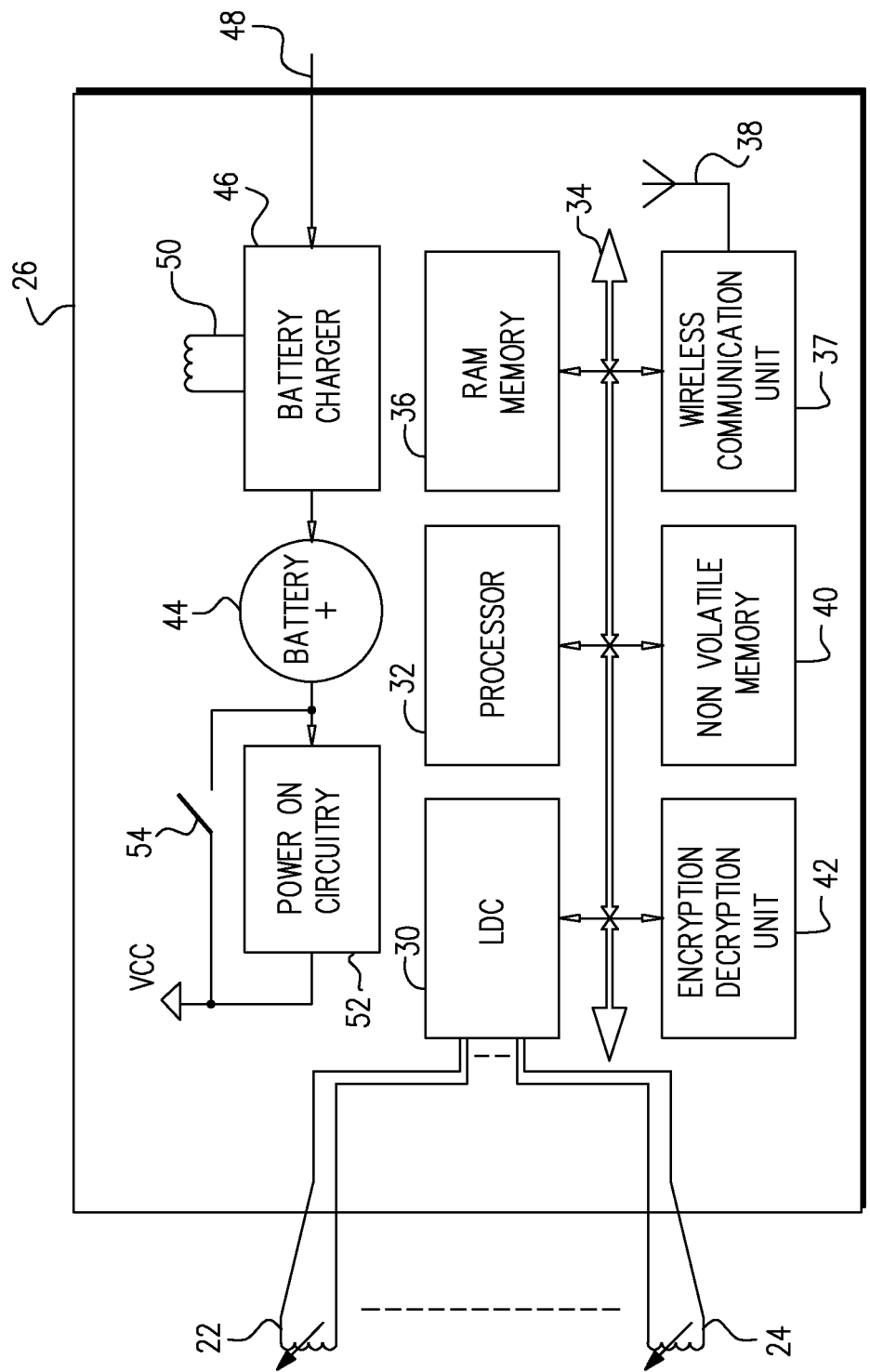
FIG. 2 is a block diagram that schematically shows electrical components of a self-measuring garment, in accordance with an embodiment of the present invention.

FIG. 2 is a block diagram that schematically shows details of controller 26, in accordance with an embodiment of the present invention. Controller 26 typically comprises a printed circuit board (which may be flexible or rigid), on which one or more integrated circuit chips and associated components are mounted. The board and components are then encapsulated in a suitable package, which is sewn onto or otherwise fastened to garment 20.

Controller 26 comprises an inductance-to-digital converter (LDC) 30, which is coupled to measure the inductance of fibers 22, 24, and particularly to detect changes in the inductance relative to a predefined baseline. LDC 30 may comprise a commercially-available component, such as the LDC1000 device produced by Texas Instruments (Dallas, Tex.). LDC 30 may operate, for example, by connecting a known capacitance in parallel with each of fibers 22, 24, and measuring the oscillation frequency of the resulting LC circuits using a suitable frequency counter. Measurements of this sort may be repeated multiple times per second in order to sense changes due to breathing and other body movements. Additionally or alternatively, LDC 30 may be replaced or supplemented by a component that transmits short pulses over fibers 22, 24 and analyzes the signals returned from the fibers in order to detect local variations in impedance of the fibers, which are indicative of both changes in the inductance and the locations along the fibers at which the changes have occurred.

LDC 30 outputs measurement values in digital form to a processor 32 via a bus 34. Processor 32 typically comprises a central processing unit (CPU), which is driven by software or firmware to carry out the functions described herein. Measurement data may be stored temporarily in a random-access memory (RAM) 36, while a non-volatile memory 40 stores software or firmware code, and possibly also persistent data, such as calibration data, user identification and other personal information. Typically, the calibration data indicate the relation between measured inductance of the various fibers 22, 24 and length, which may be determined and stored in a factory calibration procedure, and which enable processor 32 to convert the inductance measurements to physical dimensions. Alternatively or additionally, processor 32 may output raw inductance values for conversion to physical dimensions by an external computing device.

Figure 3:
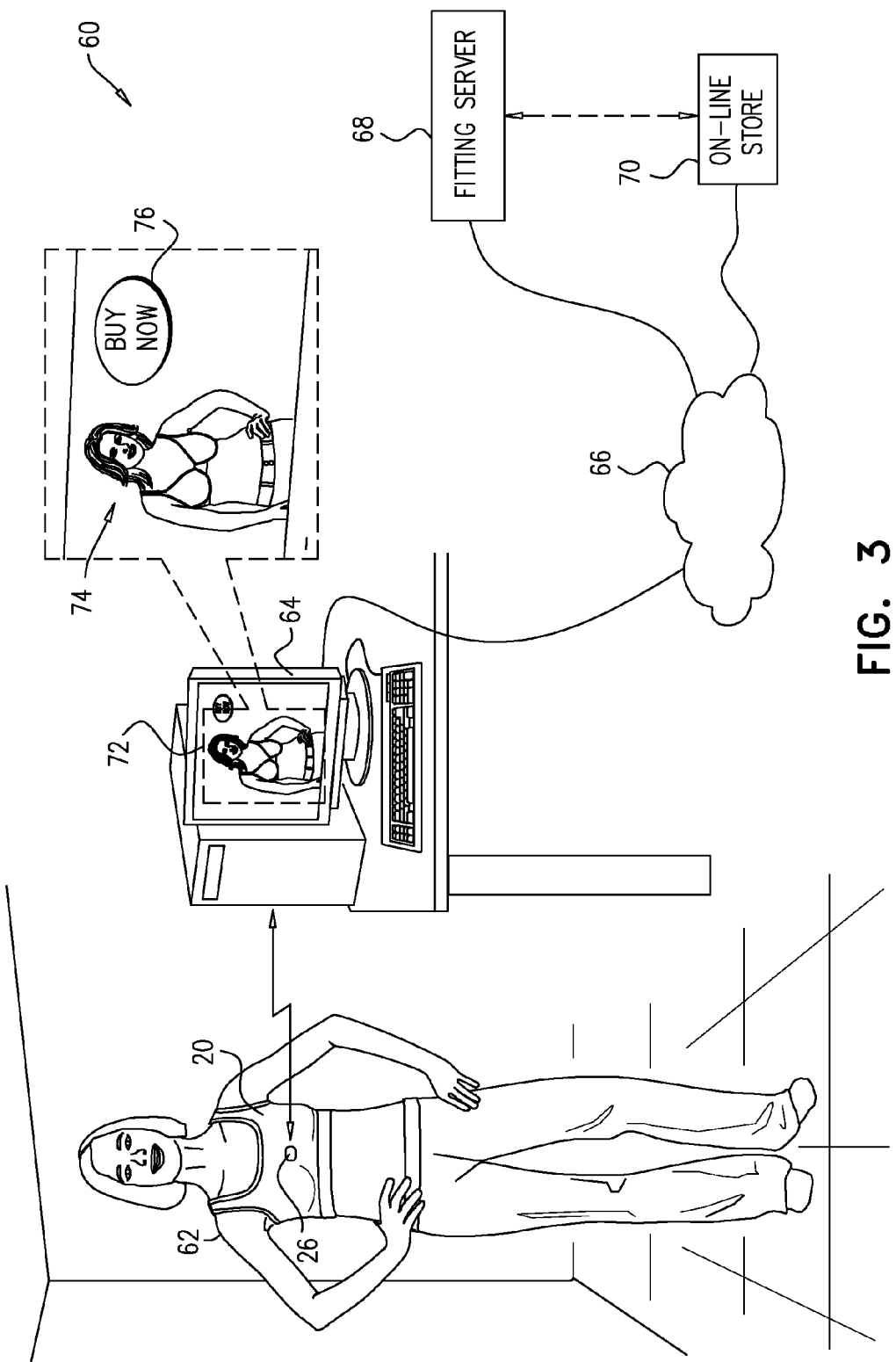
FIG. 3 is a schematic, pictorial illustration of a system for fitting and purchase of clothing, in accordance with an embodiment of the present invention.

A wireless communication link 37, such as a Bluetooth® or other short-range radio unit, transmits the data collected by processor 32 via an antenna 38 to a nearby computing device (as shown in FIG. 3) and may also receive operating instructions and/or code updates from the computing device. Alternatively or additionally, controller 26 may be connected to communicate via a suitable cable (not shown in the figures). Optionally, an encryption and/or decryption unit 42 may be included to ensure communication security.

An integral or replaceable battery 44 provides electrical power to the components of controller 26. If battery 44 is of a rechargeable type, a battery charging circuit 46 may be provided, with electrical power input either via a connector 48 or a wireless charging coil 50, as is known in the art. The circuits of controller 26 may be actuated either by a switch 54 or by an automatic power-on circuit 52, which switches on when a user puts on garment 20, for example. For this purpose, controller may measure the inductance of some or all of fibers 22, 24, one by one, over a short total time span, such as about 10 ms, and then transmit the results over wireless link 37 to an external computing device. Processor 32 then puts most of the components of controller 26 into idle or sleep mode, for example by reducing the clock frequency of the circuits. Controller 26 wakes periodically, such as once every 300 ms, repeats the brief measurement and transmission procedure described above, and then goes back to sleep. In this latter case, switch 54 may not be needed at all.

Controller 26 may optionally comprise other components (not shown in the figures), such as an inertial sensing chip (commonly referred to as a gyro sensor) to indicate the angle of body inclination, as well as acceleration. In other cases, one or more chips of this sort may be attached to garment 20 in different locations and coupled by wire to the controller.

FIG. 3 is a schematic, pictorial illustration of a system 60 for fitting and purchase of clothing based on garment 20, in accordance with an embodiment of the present invention. A user 62 wears garment 20, and controller 26 outputs indications of the relevant measurements of the user's body over the air to a computing device 64. In the illustrated example, computing device 64 is a desktop computer, but alternatively, the computing device may be a portable computer, tablet, smartphone, or any other device with suitable communication and display capabilities.

Computing device 64 may analyze the measurement data from garment 20 locally, but in the pictured embodiment, device 64 transmits the data over a network 66, such as the Internet, to a fitting server 68. The fitting server typically comprises a general-purpose computer, with suitable communication and memory facilities, which is programmed in software to convert the output values transmitted by garment 20 to size and shape parameters relevant for clothing selection. For example, in the pictured example, server 68 may extract various circumferences, strap lengths, and cup size and shape for comparison with available brassiere types and sizes. Additionally or alternatively, these size and shape parameters may be used in specifying the measurements of custom-made clothing that will be made to size in order to fit user 62.

Fitting server 68 communicates the size and shape parameters to an on-line store 70, in order to recommend the best size of clothing items selected by the user or even to choose articles of clothing that will optimally fit the body shape of user 62. The selection may be made by fitting server 68 or by an appropriate server in store 70. Alternatively, although fitting server 68 is shown in FIG. 3 as a separate entity from on-line store 70, the functions of the fitting server may be integrated into the existing server or servers of the on-line store. In either case, the size and shape parameters may be stored in server 68 for use in subsequent shopping sessions and even for shopping in other stores. Other user preferences, such as style and color, may be input via computing device 64 and/or stored by fitting server 68 or on-line store 70, and may then be taken into account in identifying the article or articles of clothing to be offered to user 62.

On-line store 70 transmits details of the selected clothing items back to computing device 64, such as one or more particular styles and sizes of brassieres. Device 64 presents these items to user 62 on a display 72, possibly showing a picture 74 of each item as it would appear on the body of a person having the measured dimensions of the user. If garment 20 is operated to measure the changes in user dimensions during movement, picture 74 can even show how the clothing item will respond to movement, by presenting an image of a moving avatar wearing the item.

Device 64 may also present an offer button 76 or other control on display 72, to be selected by user 62 in order to purchase one of the presented items. Assuming user 62 has already opened an account with on-line store 70 (so that the store has her payment and shipment details), the user need not input any further information to complete her order, since garment 20 has provided all the information that is needed to determine the appropriate size. No more than a single click on offer button 76 is then required.

Figure 4:
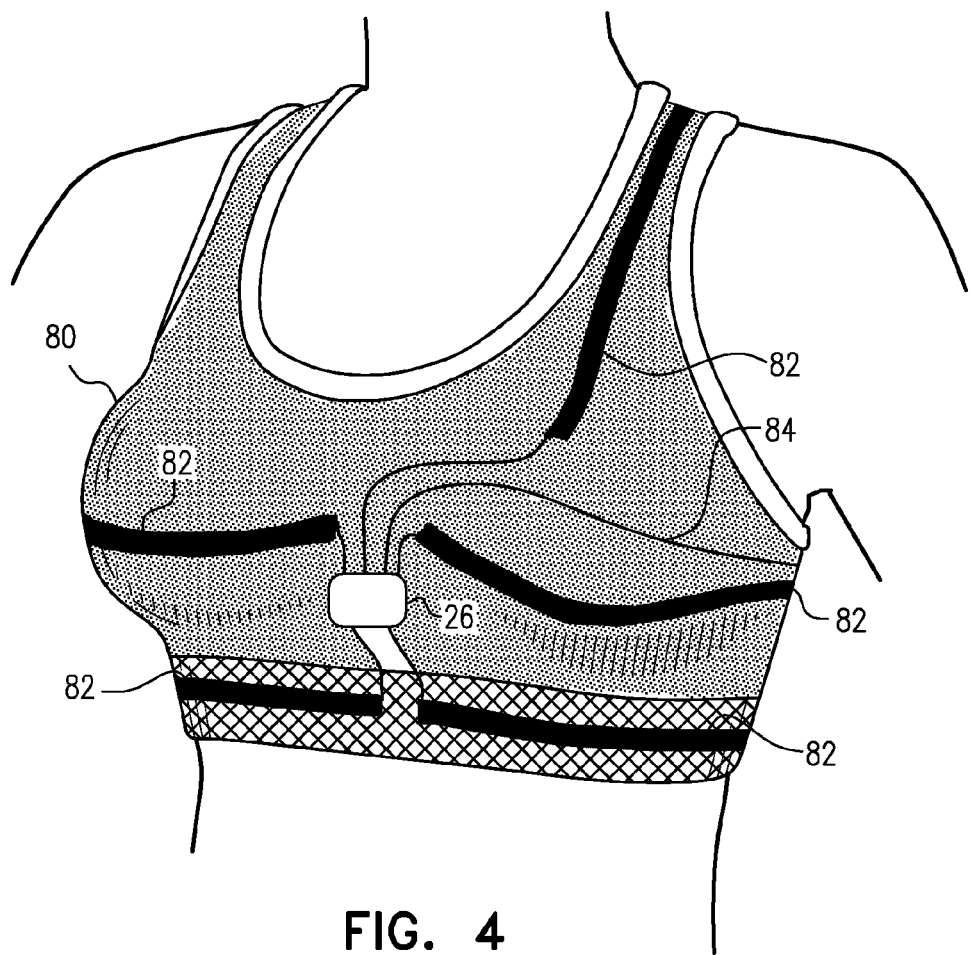
FIG. 4 is schematic, pictorial illustration of a self-measuring garment, in accordance with an alternative embodiment of the present invention.

FIG. 4 is schematic, pictorial illustration of a self-measuring garment 80, in accordance with an alternative embodiment of the present invention. Garment 80 is similar in its design and functionality to garment 20, as described above, except that measurement of body dimensions is based on strips 82, 84 of a stretchable fabric comprising conductive fibers, which are sewn into or otherwise integrated with the elastic fabric of garment 80. Strips 82, 84 may comprise, for example, Silverell® fabric, available from Less EMF Inc. (Latham, N.Y.). The inventors have found that the electrical resistance of the conductive fibers in this fabric changes as the fabric is stretched.

Thus, by measuring changes in the resistance of strips 82, 84, controller 26 is able to output an indication of body dimensions. For this purpose, instead of LDC 30, the controller may, for example, comprise a known resistor in series with strips 82, 84, . . . , along with a power source that applies a known voltage across each strip and the resistor in series. An analog/digital converter may then measure the resulting voltage across the strip, and thus the resistance of the strip.

Alternatively, strips 82, 84 may comprise conductive fibers of other sorts, having resistance that changes in response to strain (and thus stretching of garment 80). These strips may be attached externally or internally to the fabric of garment 80, or the strips may alternatively be formed by weaving, knitting or sewing the fibers directly into the fabric of garment 80.

Figure 5:
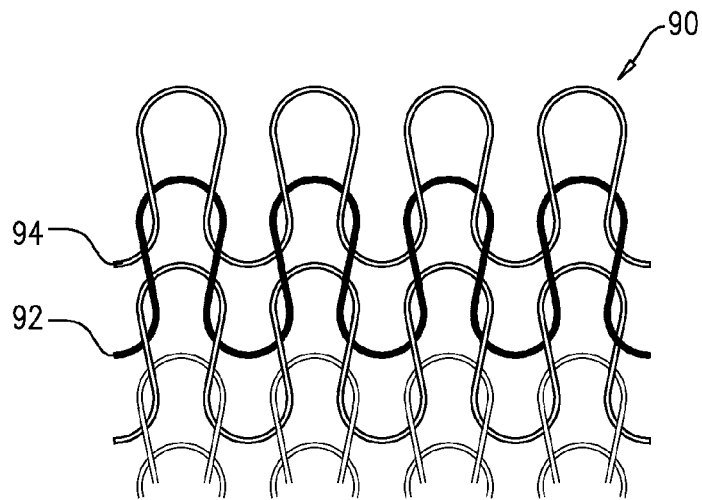
FIG. 5 is a schematic, detail view of a sensing element used in a self-measuring garment, in accordance with an embodiment of the present invention.

FIG. 5 is a schematic, detail view of a sensing element 90 used in garment 20 or 80 (or in the other self-measuring garments described herein), in accordance with an embodiment of the present invention. The garment comprises an elastic fabric 94, which is normally made of non-conductive cloth or synthetic material. A conductive fiber 92 is integrated with fabric 94 by weaving, knitting or stitching. For example, conductive fiber 92 may be sewn into fabric 94 in a zigzag stitch as illustrated in FIG. 1.

Figure 6:
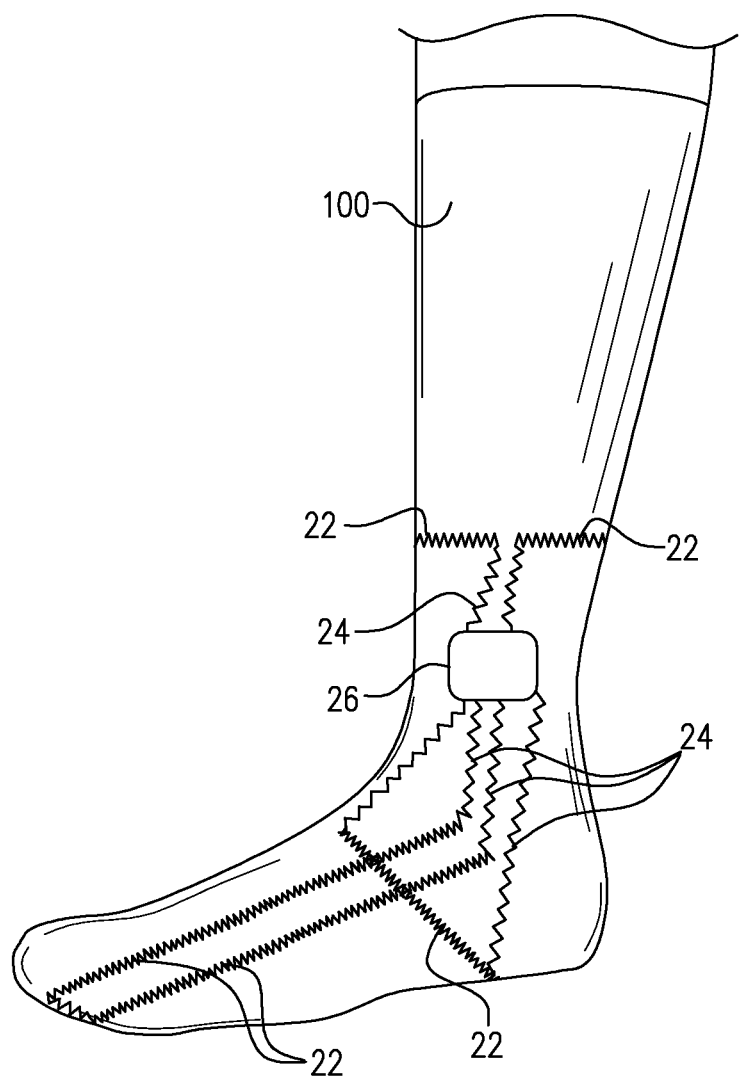
FIG. 6 is schematic, pictorial illustration of a self-measuring garment, in accordance with another embodiment of the present invention.

FIG. 6 is schematic, pictorial illustration of a self-measuring garment 100, in accordance with another embodiment of the present invention. Garment 100 in this case has the form of a sock, which may be used in fitting footwear, such as shoes or boots. (The terms "garment," "clothes" and "clothing" as used in the present description and in the claims include footwear.) Conductive fibers 22, 24 are attached to the fabric of garment 100 in zigzag stitches, as in garment 20 (FIG. 1). Controller 26 measures changes in the inductance of the zigzag fibers in order to estimate and output various dimensions of the foot, as explained above. Alternatively, the controller and fibers can be configured for resistive measurements, as in garment 80 (FIG. 4).

Figure 7:
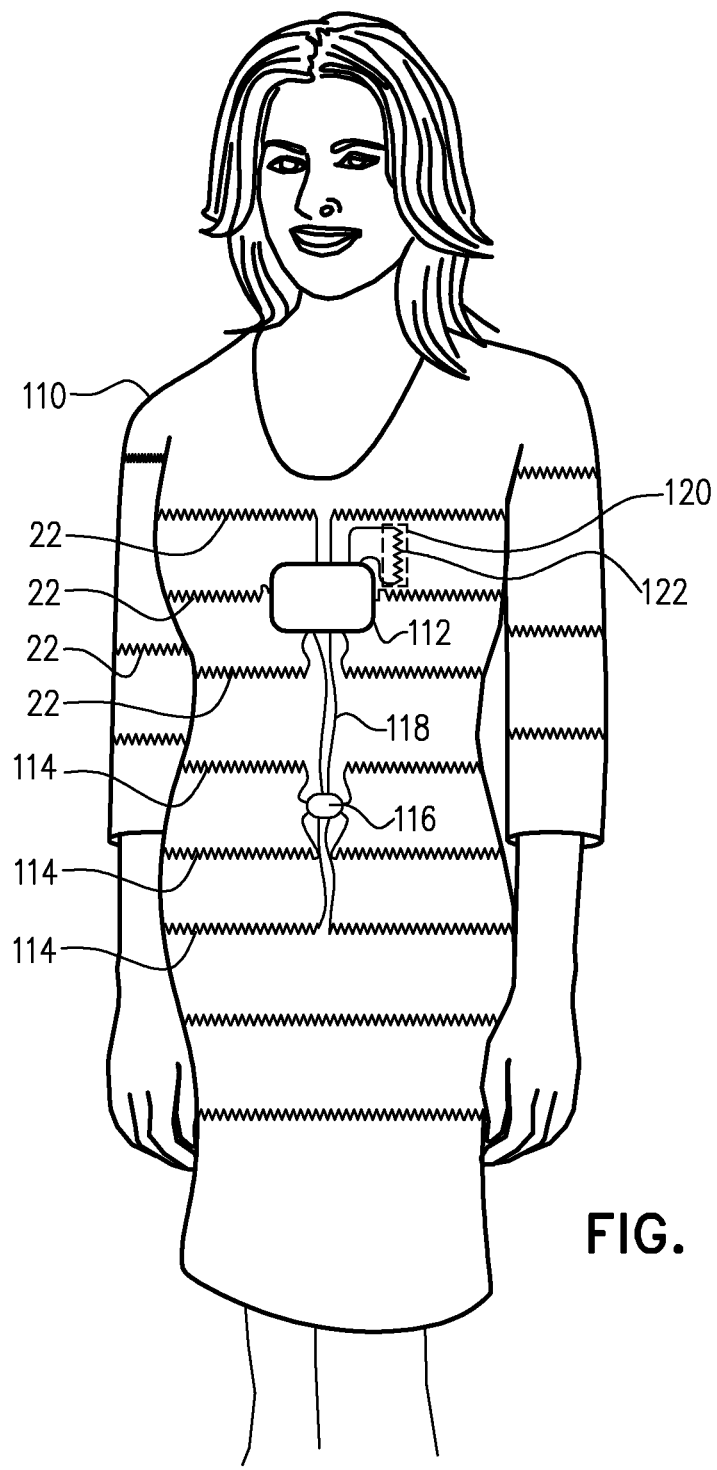
FIG. 7 is schematic, pictorial illustration of a self-measuring garment, in accordance with yet another embodiment of the present invention.

FIG. 7 is schematic, pictorial illustration of a self-measuring garment 110, in accordance with yet another embodiment of the present invention. Garment 110 extends over the torso of the subject, and thus includes a larger number of fibers 22, 114, stitched in zigzags over different areas of the garment. Assuming only measurements of body circumference are to be taken by garment 110, zigzag fibers 22, 114 are sewn primarily along horizontal directions, and garment 110 may be made from a fabric that stretches horizontally, but not vertically.

For accurate measurement of inductance, a sub-controller 116 is coupled to fibers 114 on the lower part of the torso, so that these fibers need not run all the way to a main controller 112 for measurement. Although only one sub-controller 116 is shown in the figure, garment 110 may include multiple sub-controllers of this sort in different areas. Sub-controller 116 communicates measurement results to main controller 112 via a link 118, which may be digital or analog. Main controller 112 is typically similar in structure and functionality to controller 26, as shown in FIG. 2, with the addition of link 118, while sub-controller 116 may perform only a limited part of this functionality.

The inductance of fibers 22 and 114 may be affected not only by stretching of the fabric, but also by environmental factors, such as temperature and electrical properties of the subject's skin and body tissues. To compensate for these effects, garment 110 (as well as the other garments described above) may include a non-elastic area 120, with at least one reference fiber 122 integrated into this non-elastic area. Reference fiber 122 is coupled to controller 112 so as to provide a reference against which the changes in the inductance (or other electrical properties) of fibers 22, 114 is measured. Controller 112 thus uses the measurement provided by reference fiber 122 in calibrating the measurements of fibers 22, 114 to negate the influence of environmental factors.

Although the embodiments described above and shown in the figures relate, for the sake of concreteness and clarity, to particular types and configurations of self-measuring garments, the principles of the present invention may similarly be applied in producing self-measuring garments of other types and configurations, to be worn over substantially any part of the body. Such garments may use not only the principles of inductive and resistive measurements that are explained above, but also measurement of other electrical properties of the conductive fibers, such as capacitance. All such alternative implementations of the principles and techniques described herein are considered to be within the scope of the present invention.

Use of Self-Measuring Garments in Clothing Selection

Figure 8:
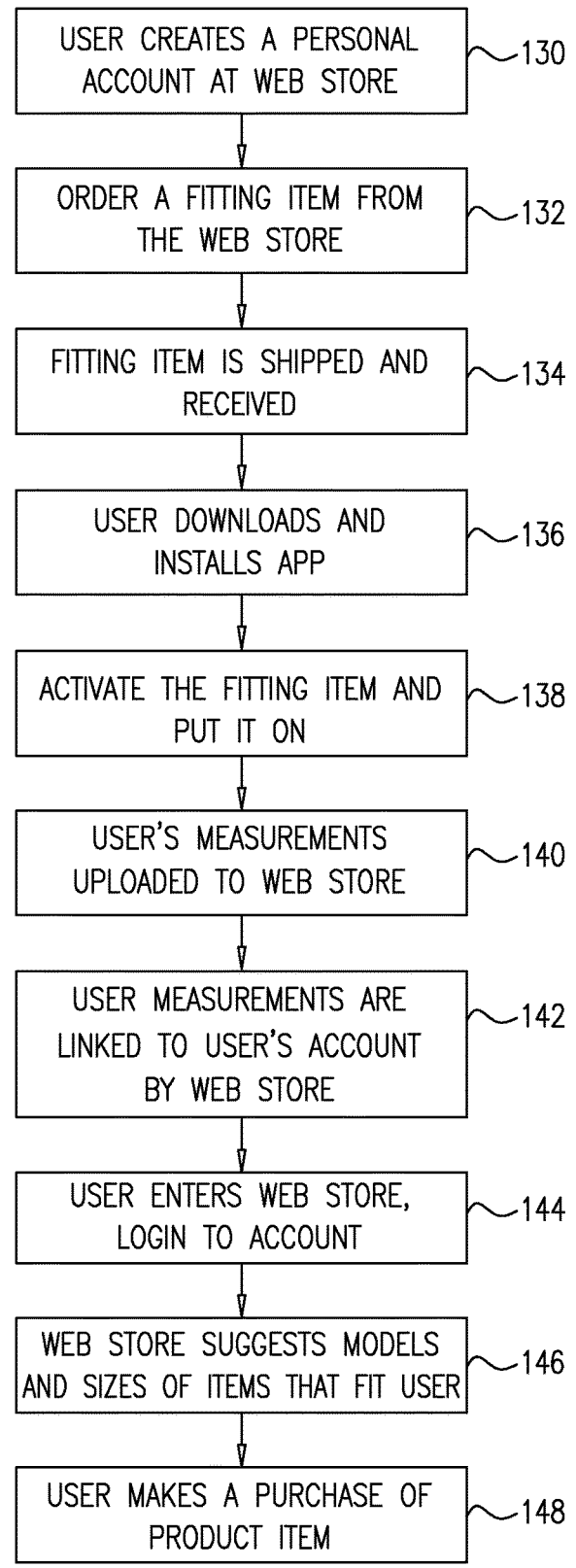
FIG. 8 is a flow chart that schematically illustrates a method for garment fitting and purchase, in accordance with an embodiment of the present invention.

FIG. 8 is a flow chart that schematically illustrates a method for fitting and purchase of clothing, in accordance with an embodiment of the present invention. The method is described, for the sake of convenience and clarity, with reference to the elements of garment 20 and system 60, as shown in FIG. 3, but the principles of this method may similarly be applied using any suitable sort of self-measuring garment and system configuration.

The method of FIG. 8 is typically initiated after user 62 has created a personal account with on-line store 70, at an account creation step 130. This step may include inputting personal information, such as billing and shipping details, as well as various user preferences. Alternatively, the method may be initiated while the user browses the Web site of store 70 and expresses interest in a given article or type of clothing, in which case the user may be prompted to create her personal account at a later stage.

As the user browses clothing of a certain type—brassieres in the present example—on the Web site of store 70, the site may prompt the user to order a "fitting item," such as self-measuring garment 20, at a garment ordering step 132. For example, the Web site may offer to sell the self-measuring garment to the user, with a promise to credit the cost of the self-measuring garment against the next purchase that the user will make from store 70. Alternatively, store 70 may offer garment 20 as a free gift to some or all users. In any case, once user 62 orders self-measuring garment 20, store 70 will ship the garment to the user, at a garment shipping step 134.

Upon receiving garment 20, user 62 downloads and installs a software application on computing device 64, at an application download step 136. The application is typically a client of fitting server 68, which enables computing device 64 to receive measurement indications over the air from controller 26 and communicate them over network 66 to the fitting server. User 62 wears and activates garment 20, at a garment activation step 138, so that the garment collects the appropriate measurements of the part of the user's body in question and conveys the measurements over the air to computing device 64. The computing device transmits a message containing these measurements over network 66 to fitting server 68, which processes and uploads the measurements to on-line store 70, at a measurement upload step 140.

Additionally or alternatively, user 62 may create an account on fitting server 68, which then stores the user measurements received at step 140 (possibly including measurements of multiple different parts of the body, taken using different self-fitting garments or a full-body suit).

On-line store 70 links these measurements of the user's body to the other user account details (as entered at step 130, for example), at a user profile creation step 142. On-line store 70 may, for example, install a software plug-in to enable the server of the on-line store to receive fitting data from and take advantage of the functionality of fitting server 68. The user profile in on-line store 70 may be created and stored in advance, before the user actually begins browsing on the Web site of store 70. Alternatively or additionally, the user measurements may be uploaded from garment 20 via fitting server 68 in real time, as long as user 62 wears garment 20 while browsing in store 70.

In either case, user 62 enters the Web site of on-line store 70 and logs into her account, at a login step 144. The user may indicate to the Web site the type, style and color of clothing that she is seeking, or store 70 may infer some or all of this information from stored user preference data and, if the user has activated garment 20, from signals transmitted by controller 26. In either case, based on the measurements of user 62 provided by garment 20, store 70 displays clothing models and sizes that are appropriate for the user, at a clothing display step 146. User 62 may then select one or more of these items for purchase, at a product purchase step 148.

Figure 9:
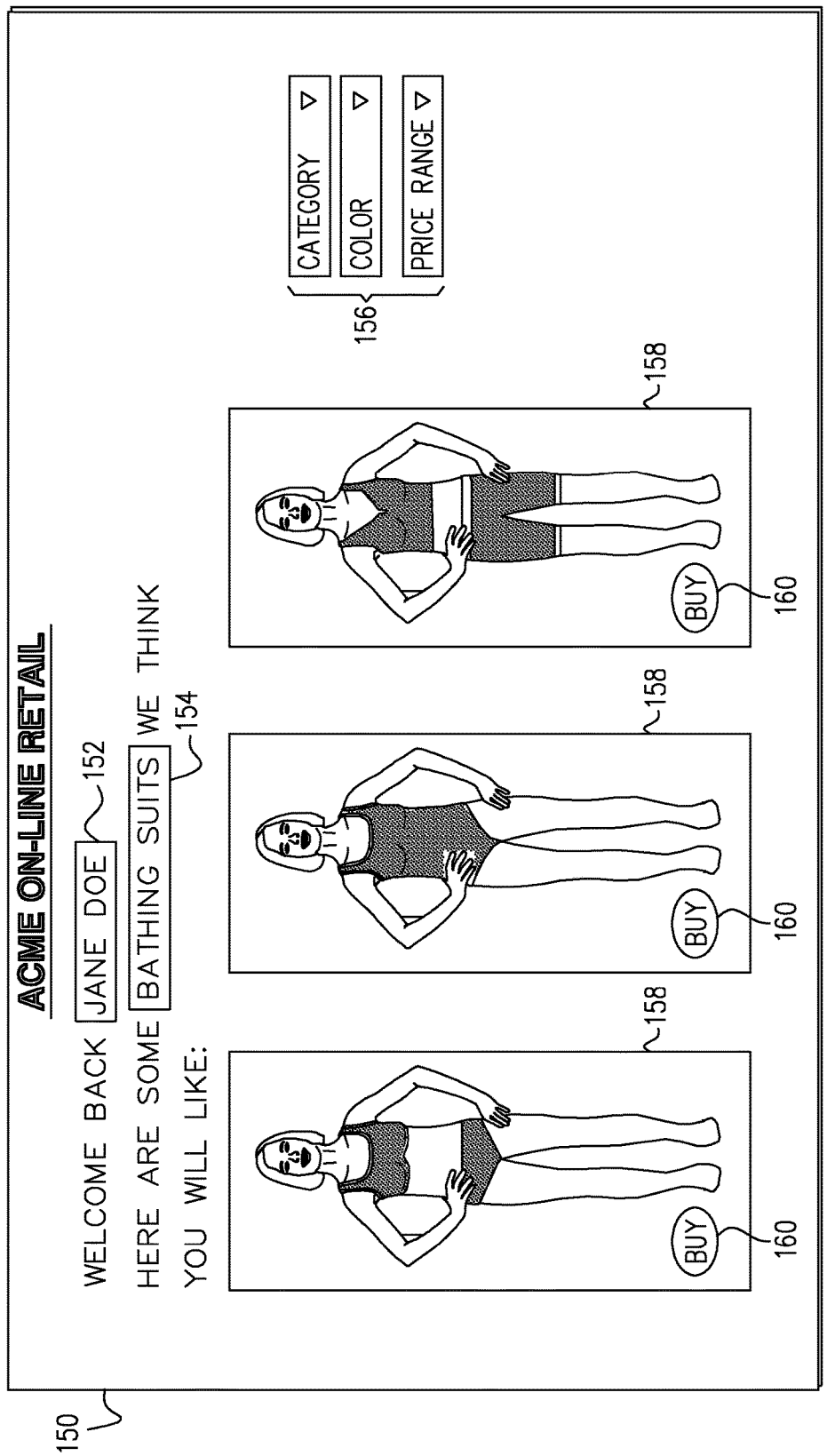
FIG. 9 is a schematic representation of a computer display presented by an on-line retail site, in accordance with an embodiment of the present invention.

FIG. 9 is a schematic representation of a computer display 150 presented by an on-line retail site, in accordance with an embodiment of the present invention. Display 150 might be representative of the sort of display generated by one-line store 70 at step 146, based on the measurement data provided by garment 20. In this case, the site has identified a user account 152, along with a type of clothing 154 (bathing suits in the present example) selected by or otherwise proposed to the user. Additional on-screen controls 156 may be provided to enable the user to specify preferences such as the category, color and price range of the clothing that she wishes to purchase.

Based on the user account data, along with measurements provided by garment 20, store 70 presents images 158 on display 150 of items of clothing of appropriate types and sizes for the user. The size information may be determined and displayed by using the above-mentioned software plug-in to invoke the services of fitting server in order to search, identify, and present the best choice of size for each item. The images may typically be accompanied by text (not shown) giving product details. Each image 158 may have an associated offer button 160 on display 150. As explained earlier, with reference to FIG. 3, the user can buy any of the displayed items with a single click on offer button 160, using a mouse or touch interface, for example. No further information is required for on-line store 70 to complete the transaction and ship the goods to the user's address.

As another alternative to this approach, fitting server 68 may use the user's measurements and personal data to search multiple stores for clothes that will fit the user well and satisfy her preferences. Server 68 will then present the user with a choice of multiple different brands and stores, in sizes appropriate for the user.

Figure 10:
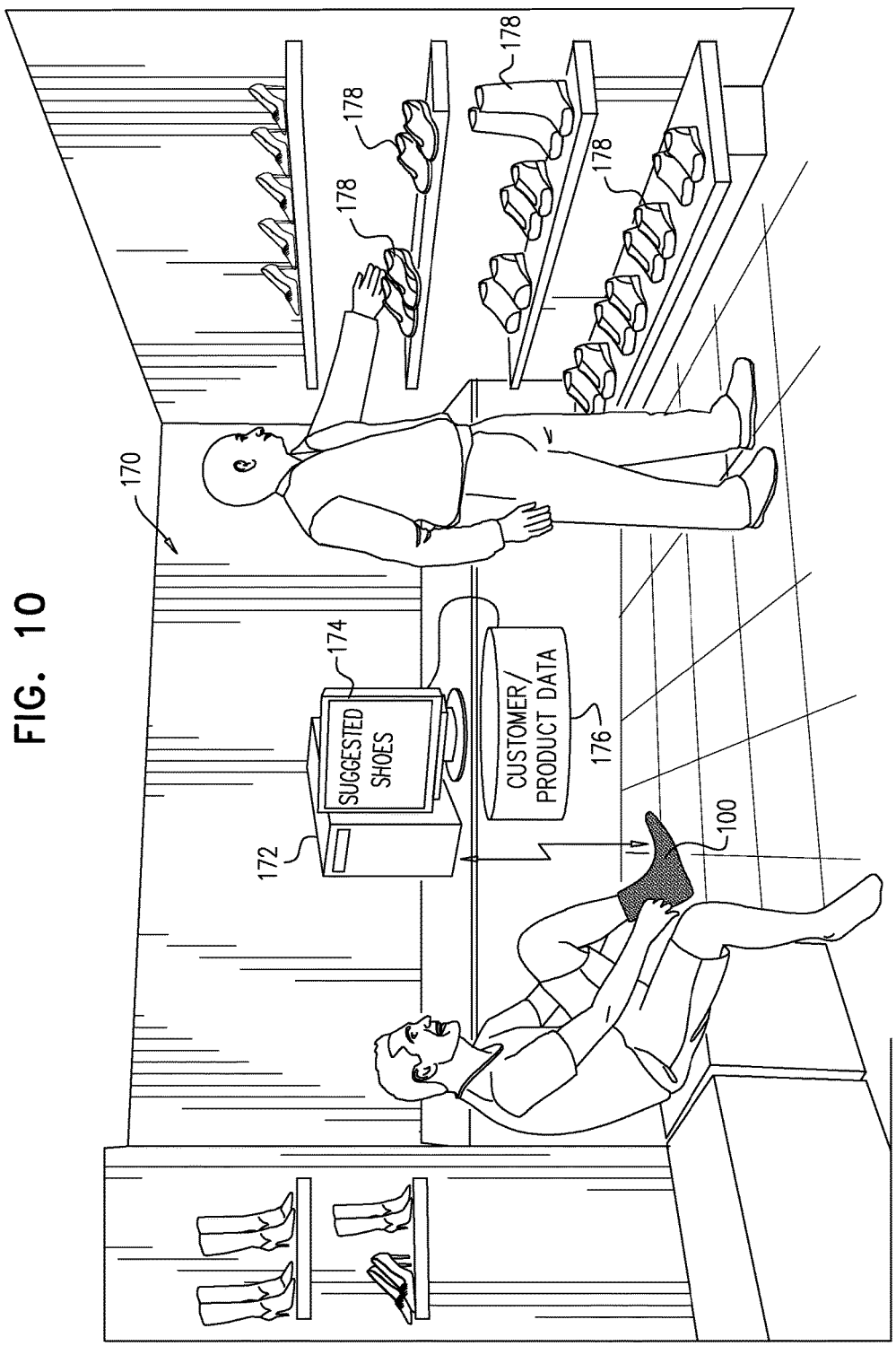
FIG. 10 is a schematic, pictorial illustration showing the use of a self-measuring garment in a store, in accordance with another embodiment of the present invention.

FIG. 10 is a schematic, pictorial illustration showing the use of self-measuring garment 100 in a commercial premises 170, such as a "brick and mortar" shoe store, in accordance with another embodiment of the present invention. To reduce the need for the customer to try on many different models and sizes of shoes 178 in order to find one that fits well, garment 100 measures the dimensions of the customer's foot and transmits the measurement data to a computer 172 in or associated with the store. Computer 172 compares the measurement data to product data stored in a memory 176, which contains fitting data with regard to the shoes offered by the store, and presents the results on a display 174. The customer and/or a salesperson can then choose shoes 178 from display 174 for the customer to try on, or even for the customer to purchase without having to try them on in advance.

The measurement data with respect to the customer's foot (or any other body parts measured in a commercial premises) may also be stored in memory 176 for use in subsequent visits to the store. Additionally or alternatively, the measurement data in memory 176 may be accessed and used in later on-line purchases by the same customer.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Measurement apparatus, comprising:
   an elastic fabric, configured as a garment to be worn over a part of a body of a human subject;
   one or more conductive fibers, integrated with the elastic fabric to as to stretch together with the elastic fabric when worn over the part of the body; and
   a controller, which is coupled to measure a change in an inductance of the one or more conductive fibers in response to stretching of the elastic fabric, and to output an indication of a dimension of the part of the body based on the measured change.

2. The apparatus according to claim 1, wherein the one or more conductive fibers are attached to the elastic fabric in a zigzag pattern, such that an angle between segments of the zigzag pattern changes in response to the stretching of the elastic fabric, thereby changing the inductance.

3. The apparatus according to claim 1, wherein the controller is further configured to measure the change in a resistance of the one or more conductive fibers in response to the stretching of the elastic fabric.

4. The apparatus according to claim 1, wherein the one or more conductive fibers comprise multiple conductive fibers arranged along multiple different paths within the garment, and wherein the controller is configured to output indications of multiple dimensions of the part of the body corresponding to the different paths.

5. The apparatus according to claim 4, wherein the multiple different paths are chosen so that the multiple dimensions are indicative of a shape of the part of the body over which an article of clothing is to be fitted.

6. The apparatus according to claim 1, wherein the garment comprises a non-elastic area, and wherein the apparatus comprises at least one reference fiber integrated with the non-elastic area of the garment and coupled to the controller so as to provide a reference against which the change in the inductance of the one or more conductive fibers is measured.

7. The apparatus according to claim 1, wherein the garment comprises a brassiere.

8. The apparatus according to claim 1, wherein the garment comprises a sock.

9. The apparatus according to claim 1, wherein the garment is configured to be worn over a torso of the human subject.

10. The apparatus according to claim 1, wherein the controller comprises a wireless communication link and is configured to output the indication of the dimension to a computing device via the wireless communication link.

11. The apparatus according to claim 10, and comprising the computing device, which is configured to identify, responsively to the dimension of the part of the body, one or more articles of clothing of a suitable size to be worn by the human subject.

12. The apparatus according to claim 11, wherein the computing device is configured to present the one or more articles of clothing on a display so as to enable the subject to select at least one of the articles.

13. A method for fitting, comprising:
   providing a garment comprising an elastic fabric configured to be worn over a part of a body of a human subject and to output electronically an indication of a dimension of the part of the body in response to a change in an inductance of one or more conductive fibers that are integrated with the elastic fabric due to stretching of the elastic fabric when worn over the part of the body;

receiving the indication of the dimension from the garment; and identifying, responsively to the dimension of the part of the body, one or more articles of clothing of a suitable size to be worn by the human subject.

14. The method according to claim 13, wherein receiving the indication comprises receiving a message containing the indication, which is transmitted over a network from a computing device, which receives the indication from the garment.

15. The method according to claim 14, and comprising storing account details with respect to the subject, and linking the account details to the dimension of the part of the body for use in a sales transaction in which one of the identified articles of clothing is supplied to the subject.

16. The method according to claim 15, wherein identifying the one or more articles comprises presenting the one or more articles to the subject on a display along with an order button for selection by the subject.

17. The method according to claim 16, and comprising completing the sales transaction, using the stored account details, in response to the selection by the subject of the order button presented with one of the articles, without additional input by the subject in connection with the selection.

18. The method according to claim 15, wherein identifying the one or more articles comprises applying the dimension of the part of the body in searching over one or more on-line stores in order to identify the one or more articles of clothing.

19. The method according to claim 13, wherein receiving the indication comprises receiving a transmission from the garment worn by the human subject in a commercial premises, and wherein identifying the one or more articles comprises presenting to the user an article offered for sale on the commercial premises.

20. The method according to claim 13, wherein the one or more conductive fibers are integrated with the fabric by attaching the conductive fibers to the elastic fabric in a zigzag pattern, such that an angle between segments of the zigzag pattern changes in response to the stretching of the elastic fabric, thereby changing the inductance.

21. The method according to claim 13, wherein the change is measured by sensing the change in a resistance of the one or more conductive fibers in response to the stretching of the elastic fabric.

22. The method according to claim 13, wherein the one or more conductive fibers are integrated with the fabric by arranging multiple conductive fibers along multiple different paths within the garment, and provide indications of multiple dimensions of the part of the body corresponding to the different paths.

23. The method according to claim 22, wherein the multiple different paths are chosen so that the multiple dimensions are indicative of a shape of the part of the body over which an article of clothing is to be fitted.

24. The method according to claim 13, wherein the garment comprises a non-elastic area, and wherein the method comprises integrating at least one reference fiber with the non-elastic area of the garment so as to provide a reference against which the change in the electrical property of the one or more conductive fibers is measured.

25. The method according to claim 13, wherein the garment comprises a brassiere.

26. The method according to claim 13, wherein the garment comprises a sock.

27. The method according to claim 13, wherein the garment is configured to be worn over a torso of the human subject.

* * * * *